F. W. KENNEDY.
LUBRICATING OIL PURIFYING AND RECLAIMING SYSTEM.
APPLICATION FILED OCT. 23, 1918.

1,318,086.

Patented Oct. 7, 1919.
2 SHEETS—SHEET 1.

WITNESS:

INVENTOR
Frank W. Kennedy
BY
ATTORNEY.

UNITED STATES PATENT OFFICE.

FRANK W. KENNEDY, OF TRENTON, NEW JERSEY, ASSIGNOR TO THE DE LAVAL SEPARATOR COMPANY, OF NEW YORK, N. Y., A CORPORATION OF NEW JERSEY.

LUBRICATING-OIL PURIFYING AND RECLAIMING SYSTEM.

1,318,086.     Specification of Letters Patent.     Patented Oct. 7, 1919.

Application filed October 23, 1918. Serial No. 259,383.

*To all whom it may concern:*

Be it known that I, FRANK W. KENNEDY, a citizen of the United States, residing at Trenton, and State of New Jersey, have invented a new and useful Improvement in Lubricating-Oil Purifying and Reclaiming Systems, of which the following is a full, clear, and exact description, reference being had to the accompanying drawings, which form a part of this specification.

The object of my invention is to provide a lubricating oil purifying and reclaiming system for sea going ships and particularly battle ships, destroyers and other ships provided with a large power plant. Where the bearings of the engines are water-cooled, it is impossible to keep the water out of the lubricating oil and it is also impossible to thoroughly remove it by settlement. Serious damage is frequently done by this oil and water mixture.

My invention involves a novel process, and a novel arrangement of mechanism adapted to carry out the process, whereby the water, as well as dirt, grit and other foreign matter can be thoroughly separated from the oil before the latter is re-used. The characteristic features of the new process and apparatus may be best understood by first describing an apparatus in which the novel combination of mechanism is embodied in its preferred form and which is best adapted to the execution of the process, reference being made to the accompanying drawings, in which—

$a$ represents, somewhat diagrammatically, a turbine engine, from which the oil that has been used to lubricate the bearings, etc., drains, through a pipe $b$, into an oil drain tank $c$. From the tank $c$ extends a pipe $d$, from which, through a pump $e$, the oil is conveyed to a pipe $f$, and thence, through an oil cooler $g$ and pipes $h$ and $i$, to pipes $j$, $j$, which communicate with the upper part of two settling tanks $m$ and $n$. A three-way valve $k$ is located at the junction of the pipes $i$, $j$, $j$.

A second pump $o$ is arranged in parallel with pump $e$, and, like it, connects pipes $d$ and $f$. One of these pumps is intended for regular service, the other for spare use.

A by-pass $p$ extends from pipe $f$ to the junction between pipes $h$ and $i$, so that either pump may be operated, when it is necessary or desirable to do so, to force the oil around the cooler direct to the settling tanks.

The settling tanks have conical bottoms which are connected, through pipes $p$, $p$, with a separator and purifier $x$ hereinafter described.

The tanks are connected, immediately above their conical bottoms, with outlet pipes $r$, $r$. From the outlet pipes $r$, the oil flows, through a pipe $s$, into a strainer $t$. After passing through the strainer, the oil is conveyed, through a pipe $u$, back to the lubricating system of the engine.

$v$ is an emergency by-pass connecting the junction of pipes $p$, $h$ and $i$ with the pipe $s$.

$w$, $w$ are overflow pipes from the settling tanks. They connect with a pipe $y$ leading back to the oil drain tank $c$.

$z$ is a reserve oil tank which connects with the pipe $q$ leading from the settling chambers of the overhead tanks $m$ and $n$ to the separator and purifier.

Figure 1:
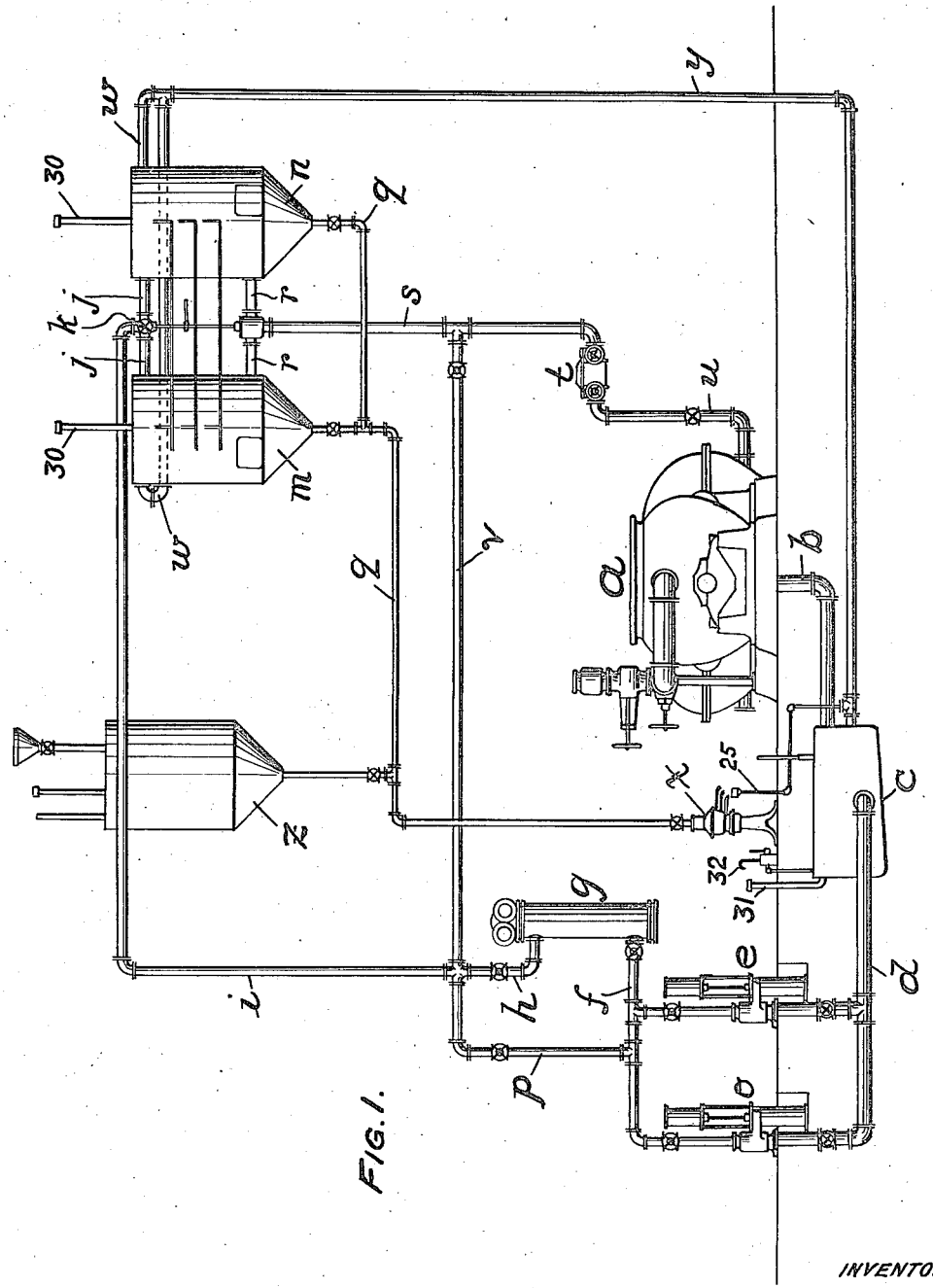
Figure 1 is a diagram of the entire system.
Figure 2:
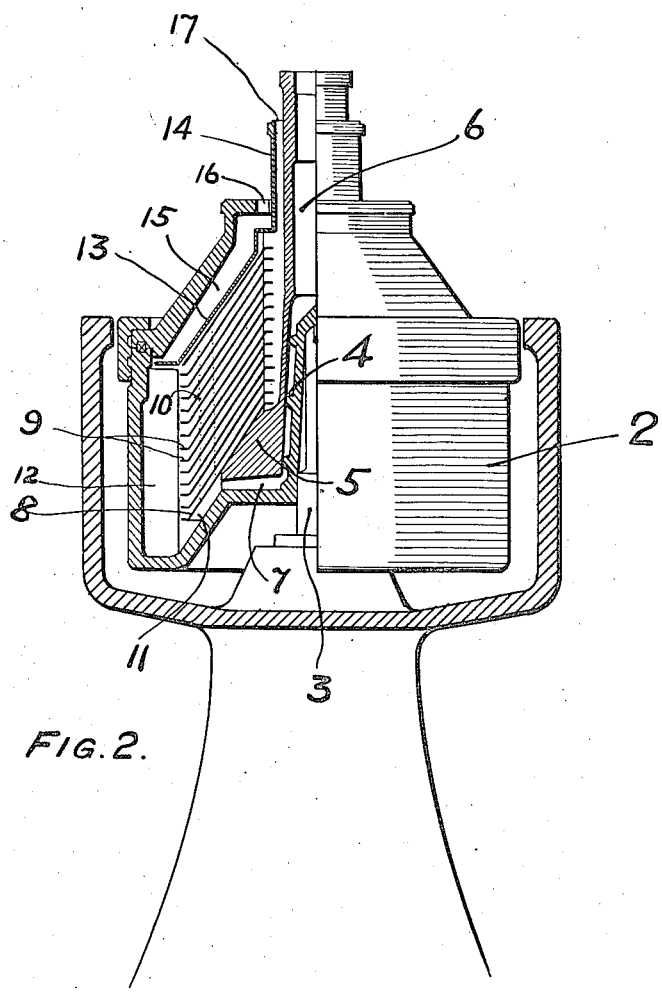
Fig. 2 is an elevation view, partly in section, of the separator and purifier.

The separator and purifier $x$ is preferably constructed in accordance with Fig. 2 of the drawings. It comprises a shell 2 carried on and revolved by a shaft 3. Fitting around a screw 4 on the bowl nave is a disk-carrier 5, an upward extension of which forms a central receiving chamber 6. Passages 7 extend from this receiving chamber toward the periphery of the bowl. Supported by the disk-carrier is a "liner" comprising a petticoat 8 and disks 9 having alining orifices 10. Leading from a point adjacent to each passage 7, between the petticoat 8 and the bowl bottom, is a driving wing 11. Upright wings 12 extend between the liner and bowl periphery. 13 is a discharge disk having a neck 14 extending above the bowl top. Wings 15 extend between the bowl top and the discharge disk 13. 16 is the discharge for the heavier constituent (water and sediment). 17 is the discharge for the lighter constituent (oil). The oil discharge pipe communicates with a funnel at the upper end of a pipe 25 leading to the pipe $y$ communicating with the oil drain tank $c$.

When a ship is first going into service, or is being put into service after overhauling or repairs, all the oil in the system should be run through the separator and purifier. This is effected by pumping all the oil from the drain tank $c$ to the overhead tanks $m$ and *n*. The drain tank should then be cleaned and the oil allowed to return to it through the separator and purifier *x*. The overhead tanks should then be cleaned, thus removing all sediment from the system.

In normal operation, the oil is pumped continuously from the oil drain tank *c* to the settling tanks *m* and *n*. Any known regulator may be employed to maintain the pump at the speed required to pump the full supply of oil without pumping an excess of oil, although any such excess will return, through the overflow line *w*, *y*, to the drain tank *c*. Ordinarily, the valves will be operated to cause the oil to pass through the cooler *g*. The cooler is provided to reduce the temperature of the oil. The heat from friction of the bearings and gears of the turbine, and the heat that is transmitted to the bearings by the steam, is taken up by the oil. It is this heat that is removed by the cooler. Oil leaving the cooler should not be over 100 to 110 degrees F. Without the cooler, the temperature of the oil will be such as to overheat the bearings, gears and other parts of the turbine. In some cases, when a ship is in cold water, particularly when the drain tank *c* is in contact with the hull of the vessel, it may be necessary to cut out the cooler and pump the oil through the by-pass *p* to the pipe *i*.

In the settling tanks *m* and *n*, the sediment and water settle in the conical bottoms communicating with pipes *q*. From time to time this dirty watery oil is allowed to flow to the separator and purifier *x*, wherein the oil is separated from the water and sediment and allowed to flow back into the drain tank *c*.

The overhead tanks *m* and *n* insure a constant uniform pressure on the oiling system and serve to eliminate the pulsations which are produced by a reciprocating pump when used in a closed system. They also act as storage tanks in case of stoppage of the oil pump. For this reason the outlets from the settling tanks to the turbine are placed at a relatively low level but safely above that to which the contained water might rise. Preferably, the tanks are installed in duplicate, so that one can be held in reserve. The reserve tank can be used for storing oil while cleaning the oil drain tank *c* or the other supply tank. Each tank should be provided with a vent 30, suitably hooded and screened. In case of an oversupply of oil to the settling tanks, the excess will be carried through the overflow line *w*, *y* to the drain tank *c*. Any suitable float alarm may be installed in the settling tanks to notify the engine crew in case the oil supply should fall below a safe level.

The oil strainer *t* should be installed in duplicate or should be of the twin type indicated, to permit of clearing the strainer while the oiling system is in service. The strainer is, of course, not adapted to remove grit, dust or small particles, which are taken care of by the separator and purifier *x*, but it should be capable of removing any heavy sediment and material which, for any reason, is not removed by settlement in the tanks *m* and *n*.

It will be observed that the separator and purifier is so piped that it can be used at all times whether the system be in service or not. It is impracticable to attempt to purify the full amount of oil each time as it is fed to the turbine. For this reason the separator and purifier is placed on a shunt between the overhead tanks and the drain tank, so that it can be used to purify only the contaminated oil in the overhead tanks which settles to the bottom; although, of course, in any given contingency or emergency, it can be used to purify all the oil in the tanks. Thus, it is advisable, at the end of each trip, to pass the entire amount of oil through the separator and purifier. Normally, it is advisable to operate the separator and purifier for about one-half hour every watch.

The oil drain tank, like the overhead storage and settling tanks, should be provided with a vent 31. It should also be provided with a float indicator. A small hand-driven sampling pump 32 should be connected to the tank very close to its bottom, so that the condition of the oil at the bottom may be determined at any time. It may also be used to pump out the tank for purifying the oil or cleaning the tank.

The system is especially applicable for use on ships because, when the ship is in motion, oil cannot be satisfactorily cleaned or purified by settling. Further, even where opportunity for proper settling exists, too much time is required to settle out water that has become thoroughly mixed with the oil, and light particles, such as lint, settle very slowly. While the invention is especially applicable to ships, it may be found applicable to other lubricating systems.

The relative location of the various elements is of importance. Thus, the strainers and coolers should not be installed in the suction line between the drain tank and the oil pumps, as this may cause sufficient friction to so increase the suction lift as to increase the liability of the pumps losing their suction when handling hot oil or when a small air leak is present. The cooler should not be installed between the overhead tanks and the turbine, as friction loss in the cooler may reduce the oil pressure at the turbine below a safe amount. While the strainers should be located between the overhead tanks and the turbine, care must be taken that they are of sufficient size to avoid excessive loss of head even when the strainers are fairly well clogged. Hence, the strainers should be much larger than would ordinarily be used in a pressure system. The drain tank should be placed sufficiently below the turbine to insure complete drainage of the turbine and gear casing, even though the ship be rolling or pitching. The separator and purifier should, as hereinbefore stated, be located between the overhead supply tanks and the drain tank.

Having now fully described my invention, what I claim and desire to protect by Letters Patent is:

1. In a lubricating oil purifying and reclaiming apparatus, the combination with an engine, of an oil discharge and supply system comprising a tank adapted to receive and hold oil and pipe connections between the tank and the engine adapted to convey oil from the engine to the tank and from the tank back to the engine, and a centrifugal separator and purifier connected with said system and adapted to receive oil therefrom and purify it by the removal of sediment and water for re-use in the engine and return the oil so separated and purified to the system.

2. In a lubricating oil purifying and reclaiming apparatus, the combination with an engine, of a settling tank, connections between the engine and the tank and between the tank and the engine adapted to convey oil from the engine to the tank and from the tank back to the engine, a separate outlet pipe from the settling tank, and a centrifugal separator and purifier communicating with the last named pipe and adapted to receive oil therefrom and purify it by the removal of water and sediment for re-use in the engine.

3. In a lubricating oil purifying and reclaiming apparatus, the combination with an engine, of a drain tank adapted to receive oil from the engine, a second tank, a pipe connection from the drain tank to the second tank, and a centrifugal separator and purifier connected with the second tank and adapted to receive oil therefrom and purify it by the removal of water and sediment for re-use in the engine.

4. In a lubricating oil purifying and reclaiming apparatus, the combination with an engine, of a settling tank, connections between the engine and the tank and between the tank and the engine adapted to convey oil from the engine to the tank and from the tank back to the engine, an independent connection from the settling tank to the outflow connection from the engine to the tank, and a centrifugal separator and purifier interposed in the last named connection and adapted to receive oil therefrom and purify it by the removal of water and sediment for re-use in the engine.

5. In a lubricating oil purifying and reclaiming apparatus, the combination with an engine, of a drain tank adapted to receive oil from the engine, an overhead settling tank, a pipe connection from the drain tank to the settling tank, a pump interposed in said connection, a pipe connection from the settling tank to the engine, a centrifugal separator and purifier adapted to separate water from oil, a pipe connection from the settling tank to the separator and purifier, and means to convey oil, separated and purified by passage through the separator and purifier, to the drain tank.

6. In a lubricating oil purifying and reclaiming apparatus, the combination with an engine, of a drain tank adapted to receive oil from the engine, an overhead settling tank, a pipe connection from the drain tank to the settling tank, a pump interposed in said connection, independent connections from the settling tank to the engine and drain tank respectively, a strainer interposed in the first connection, and a centrifugal separator and purifier interposed in the second connection and adapted to eliminate water from the oil passing therethrough.

7. In a lubricating oil purifying and reclaiming apparatus, the combination with the engine, of an oil circulating system from the oil discharge from the engine to the oil supply to the engine comprising a drain tank, a pump, a cooler and a settling tank through which the used oil successively travels from and back to the engine, an independent connection from the settling tank to the drain tank, and a centrifugal separator and purifier interposed in said connection and adapted to eliminate water from the oil passing therethrough.

8. In a lubricating oil purifying and reclaiming apparatus, the combination with an engine, of a drain tank adapted to receive oil from the engine, an overhead settling tank, a pipe connection from the drain tank to the settling tank, a pump interposed in said connection, an outflow pipe to the engine communicating with the settling tank above its bottom, thereby affording a space in the settling tank below said outflow for collecting oil contaminated with water, an outflow pipe from the bottom of the settling tank to remove the oil and water mixture, a centrifugal separator and purifier communicating with said pipe for eliminating the oil from the water, and an overflow pipe communicating with the upper part of the settling tank and with the drain tank.

9. In a lubricating oil purifying and reclaiming apparatus, the combination with an engine, of a drain tank adapted to receive oil from the engine, a pair of pumps, means for drawing oil from the drain tank through either pump, a settling tank, a pipe leading thereto, a cooler and a by-pass, means whereby oil from either pump may be conveyed to said pipe through either the cooler or the by-pass, a pipe connection from above the bottom of the settling tank to the engine, a pipe connection from the bottom of the settling tank, and a centrifugal separator and purifier communicating with the last named pipe connection and adapted to free the oil from the water mixed therewith.

10. In a lubricating oil purifying and reclaiming apparatus, the combination with an engine, of an oil circulating system comprising a tank adapted to receive oil from the engine, a settling tank, and pipe connections through which oil is conveyed from the first tank to the settling tank and the engine; a centrifugal separator and purifier adapted to receive oil from the settling tank, purify it by the removal of water and sediment for re-use in the engine and return it to the circulating system.

11. In a lubricating oil purifying and reclaiming system, the process which consists in conveying oil drained from the engine to a body of oil, conveying oil from the body of oil to the engine, subjecting oil which has been so drained from the engine to the action of centrifugal force to eliminate the water therefrom, and returning the so separated and purified oil to the oil circulation system.

12. In a lubricating oil purifying and reclaiming system, the process which consists in conveying oil drained from the engine to a body of oil, allowing said body of oil to settle to precipitate contained water and dirt, conveying to the engine the upper layer of liquid comprising oil free from water, withdrawing the lower layer of liquid comprising oil mixed with water, and subjecting the mixture to the action of centrifugal force to eliminate the water from the oil.

13. In a lubricating oil purifying and reclaiming system, the process which consists in establishing an endless circulation of oil from the oil discharge from the engine to the oil supply thereto, allowing settlement of the oil in the course of its circulation, withdrawing the heavier liquid, comprising oil mixed with water, from the endless circulation, subjecting said mixture to the action of centrifugal force to eliminate the water from the oil, and returning the purified oil to said endless circulation at a point therein between the oil discharge from the engine and the locus of settlement.

14. In a lubricating oil purifying and reclaiming system, the process which consists in accumulating a body of used oil as it drains from the engine, pumping oil from said body to a relatively high elevation and accumulating a second body of oil, permitting settlement of the second body of oil, withdrawing the oil purified by settlement and conveying it back to the engine for re-use, withdrawing the lower layer of contaminated oil from the second body of oil and subjecting the same to the action of centrifugal force to eliminate the water and purify the oil, and conveying the thus purified oil to the first body of drained used oil.

15. In a lubricating oil purifying and reclaiming system, the process which consists in draining oil from the engine to a body of oil, conveying oil from said body of oil to a second body of oil and to the engine, allowing said second body of oil to settle to precipitate contained water and dirt, withdrawing the settled oil mixed with water and subjecting the mixture to the action of centrifugal force to eliminate the water from the oil, and conveying the purified oil to the first body of oil.

In testimony of which invention I have hereunto set my hand, at Trenton, N. J., on this 17th day of October, 1918.

FRANK W. KENNEDY.